United States Patent [19]

Brems et al.

[11] Patent Number: 4,865,180
[45] Date of Patent: Sep. 12, 1989

[54] WORKPIECE TRANSFER SYSTEM

[75] Inventors: John H. Brems, Boca Raton, Fla.; Arthur C. Mason, Warren, Mich.

[73] Assignee: Lamb Technicon Corp., Warren, Mich.

[21] Appl. No.: 160,021

[22] Filed: Feb. 24, 1988

Related U.S. Application Data

[62] Division of Ser. No. 763,350, Aug. 7, 1985, Pat. No. 4,750,605.

[51] Int. Cl.$^4$ .............................................. B65G 25/00
[52] U.S. Cl. ................... 198/468.6; 198/774
[58] Field of Search ............... 198/468.6, 614, 774; 414/750, 749

[56] References Cited

U.S. PATENT DOCUMENTS

| | | | |
|---|---|---|---|
| 2,899,043 | 8/1959 | Young | 198/468.6 |
| 3,481,450 | 12/1969 | Umbricht | 198/774 |
| 4,209,087 | 6/1980 | Kushigian | 198/774 |
| 4,236,626 | 12/1980 | Noe | 198/468.6 |
| 4,530,637 | 7/1985 | Mason et al. | 74/103 |
| 4,669,607 | 6/1987 | Mason | 414/750 |
| 4,750,605 | 6/1988 | Brems et al. | 198/774 |

*Primary Examiner*—Joseph E. Valenza
*Attorney, Agent, or Firm*—Barnes, Kisselle, Raisch, Choate, Whittemore & Hulbert

[57] ABSTRACT

A system for transferring workpieces generally vertically from a station at one height in a workpiece support or transfer device to a station at another height in another transfer device or support. The workpiece is moved vertically by an elevator which travels along a path through the stations from a point below the lower station to a point above the upper station. To smoothly and rapidly move the workpiece the elevator is accelerated and decelerated and dwells at least when picking up and depositing a workpiece. To avoid collisions, interference and the necessity of precisely synchronizing movement of the transfer and elevator, when in its fully raised and lowered positions, the elevator is clear of and does not interfere with the transfer and supports and any workpieces in the stations.

16 Claims, 7 Drawing Sheets

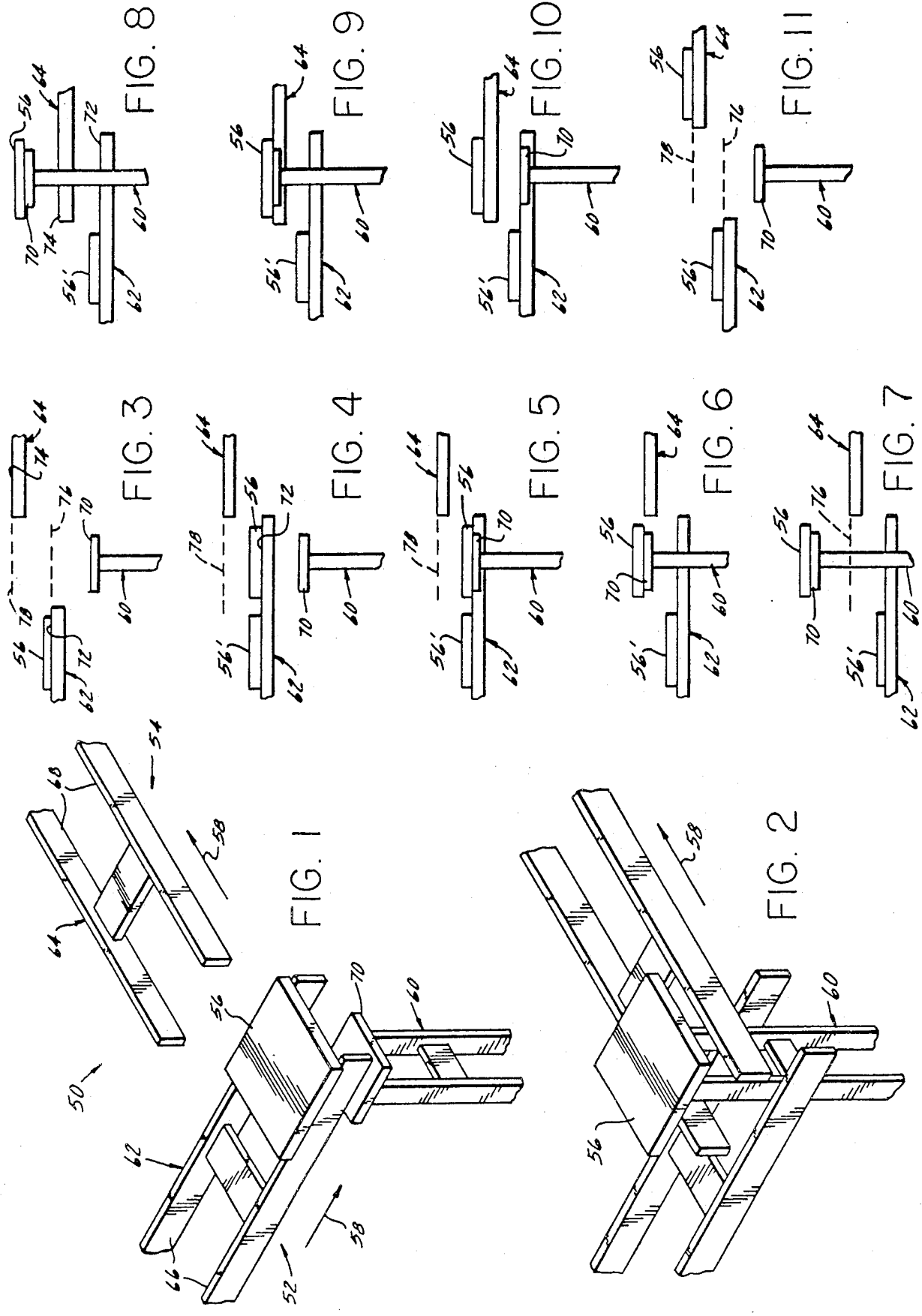

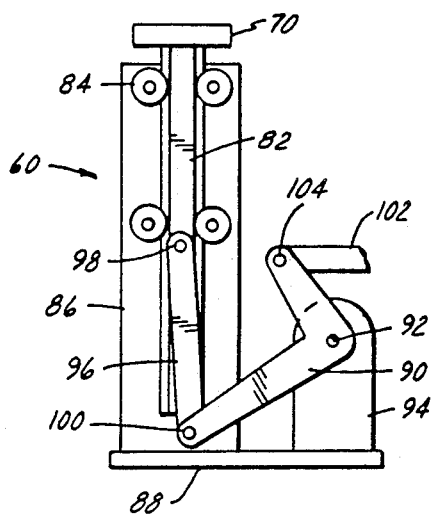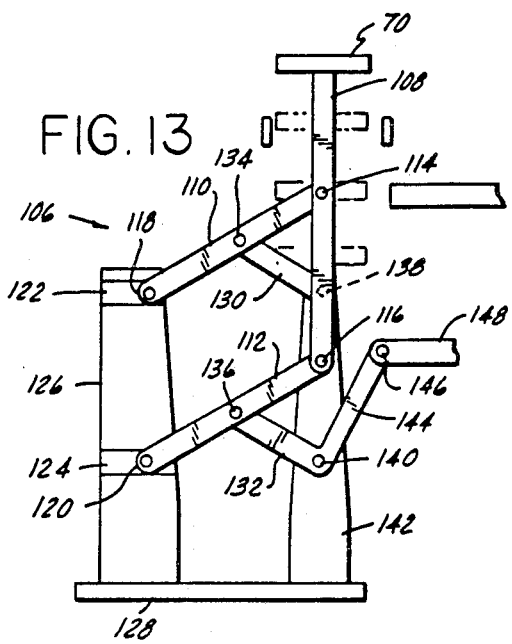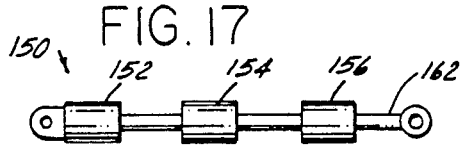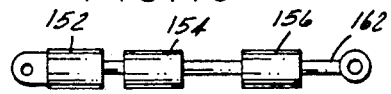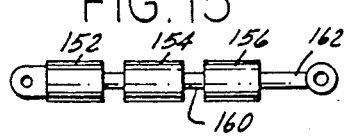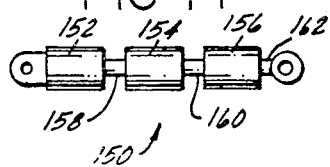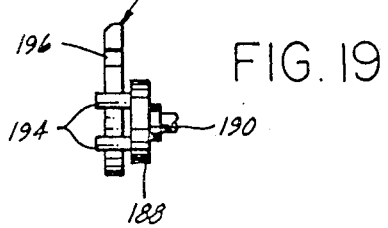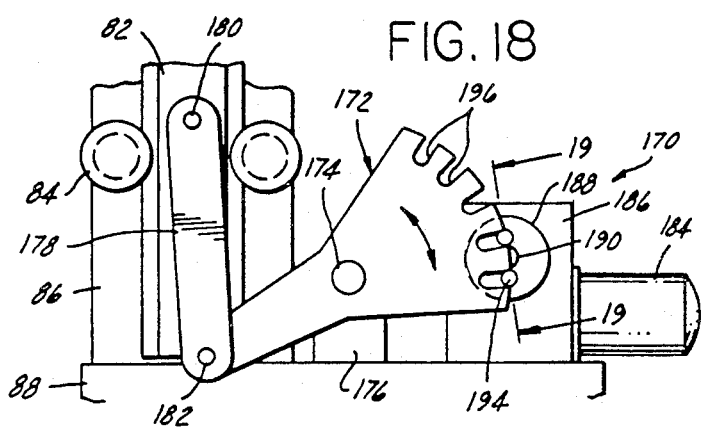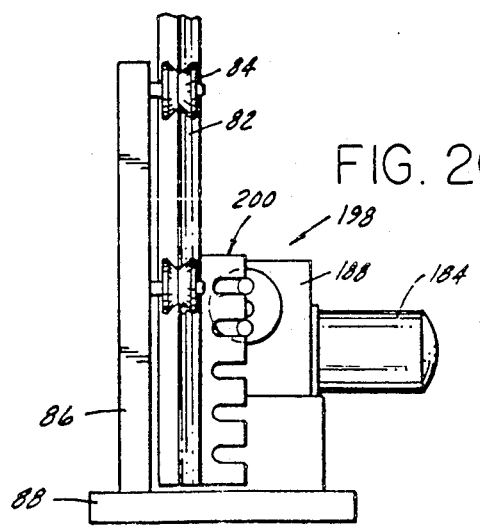

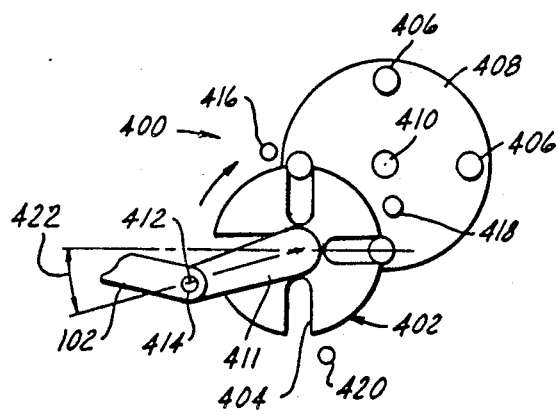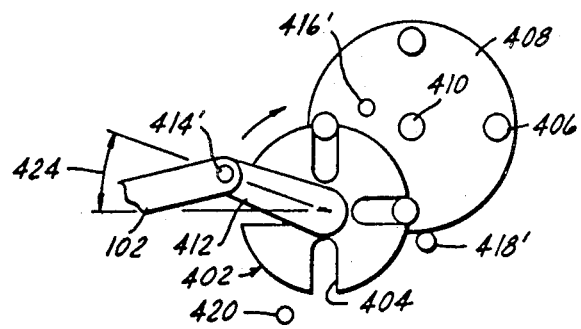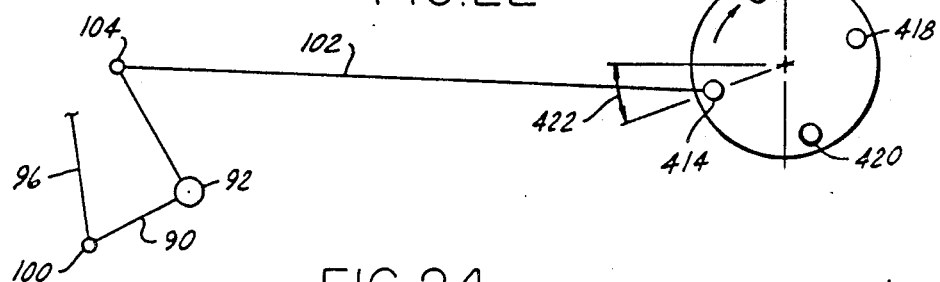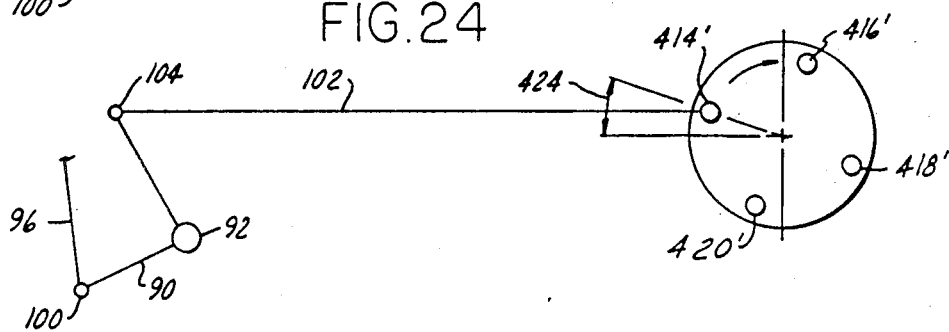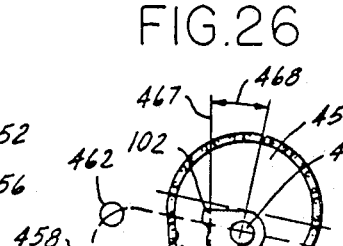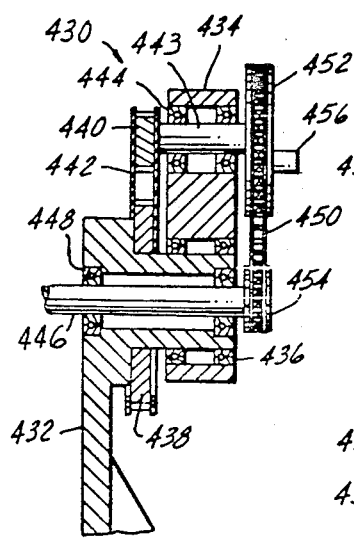

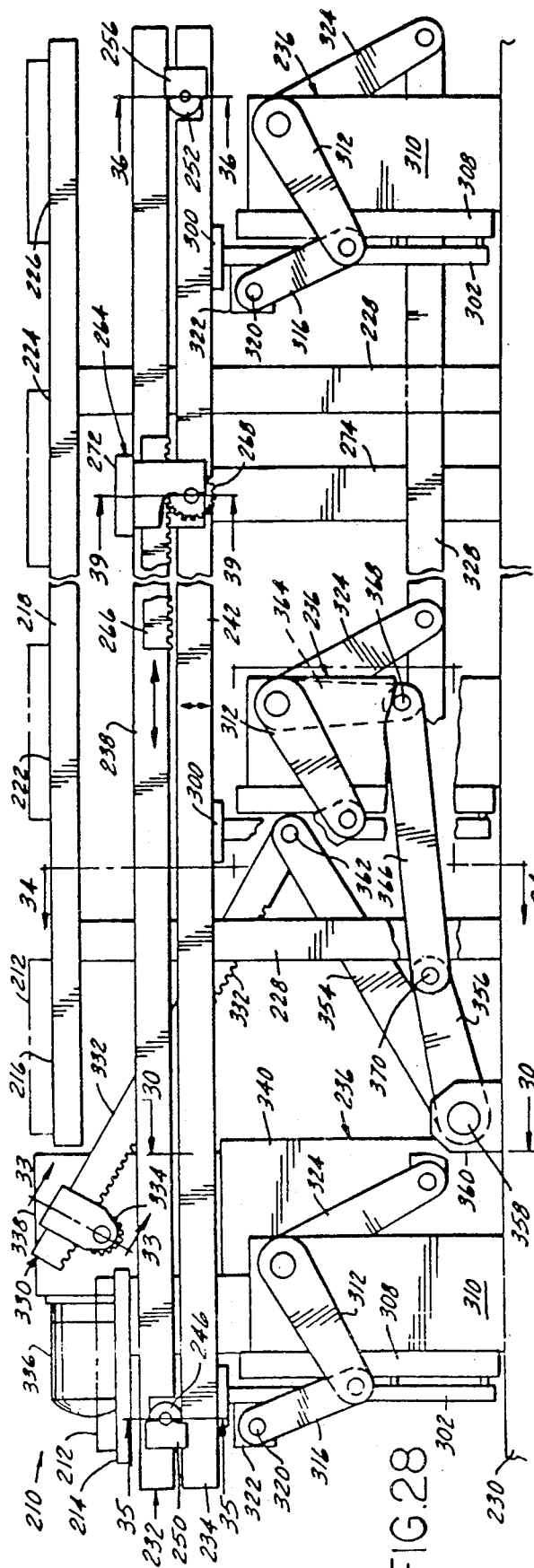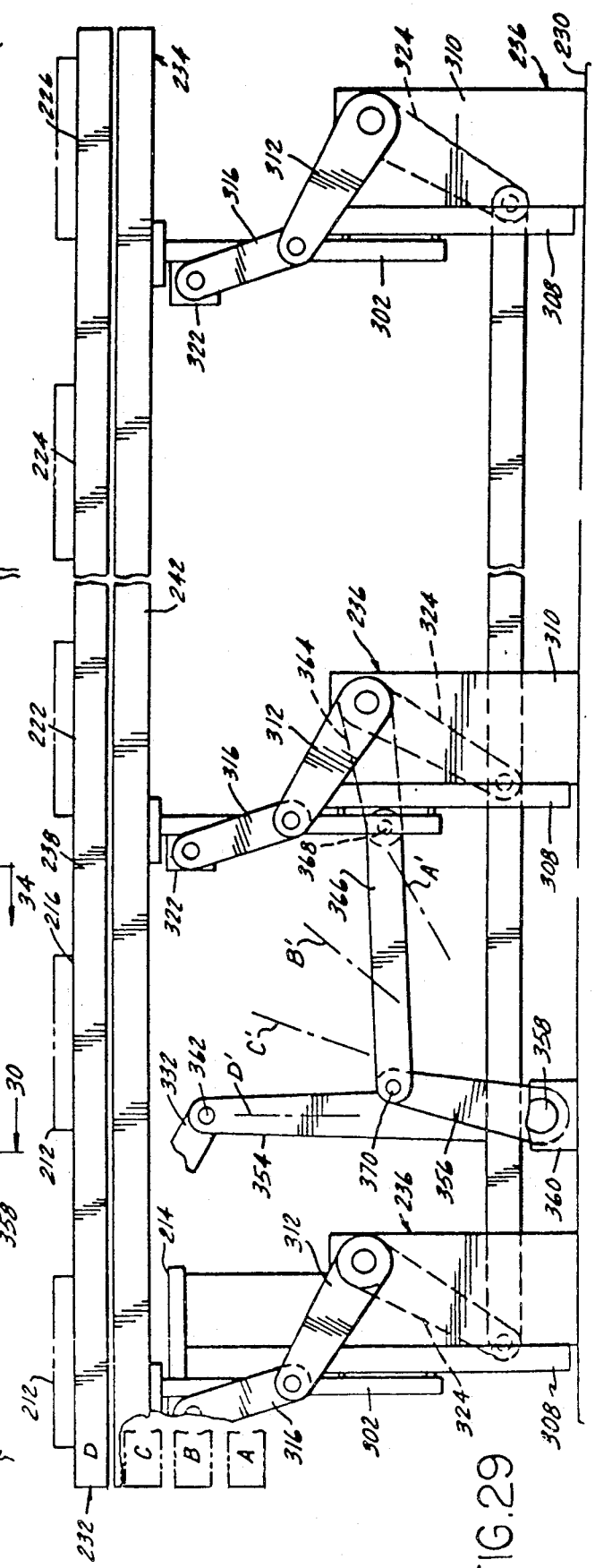
FIG.28
FIG.29

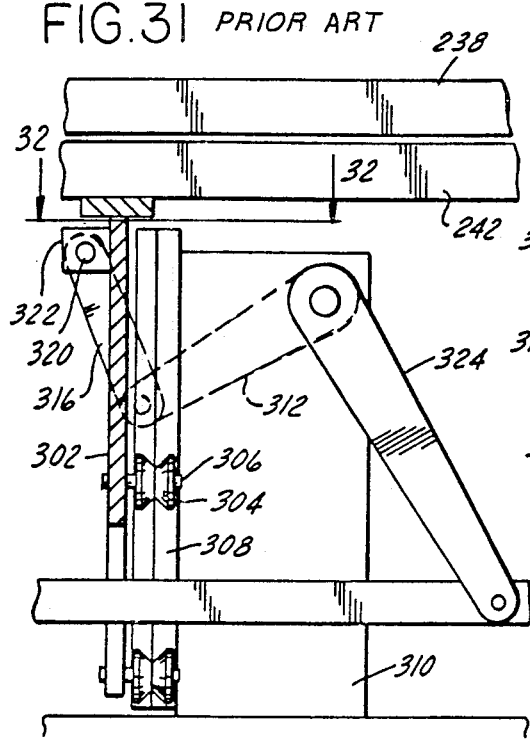
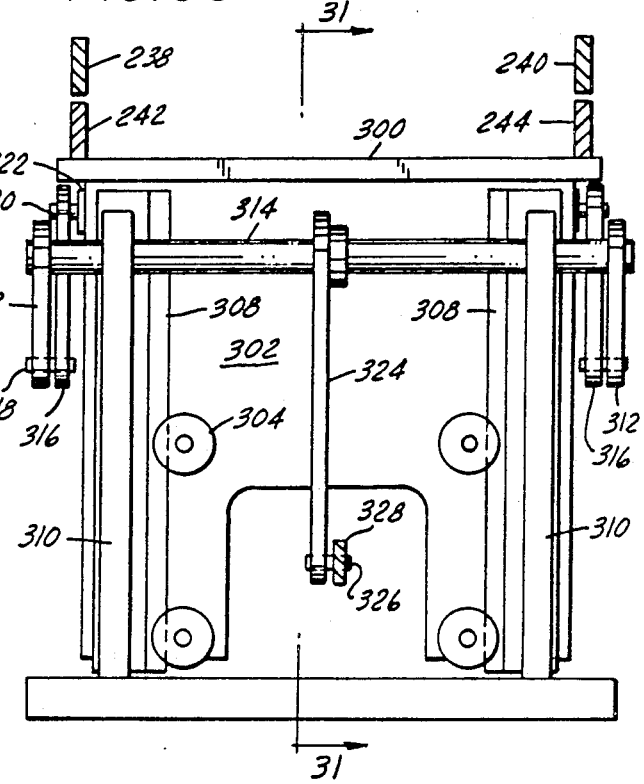
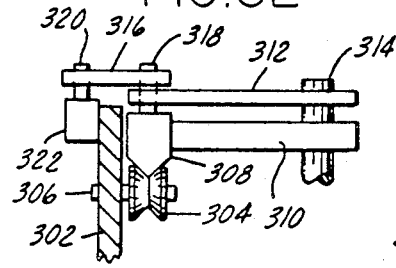
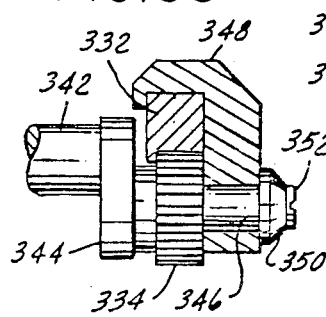
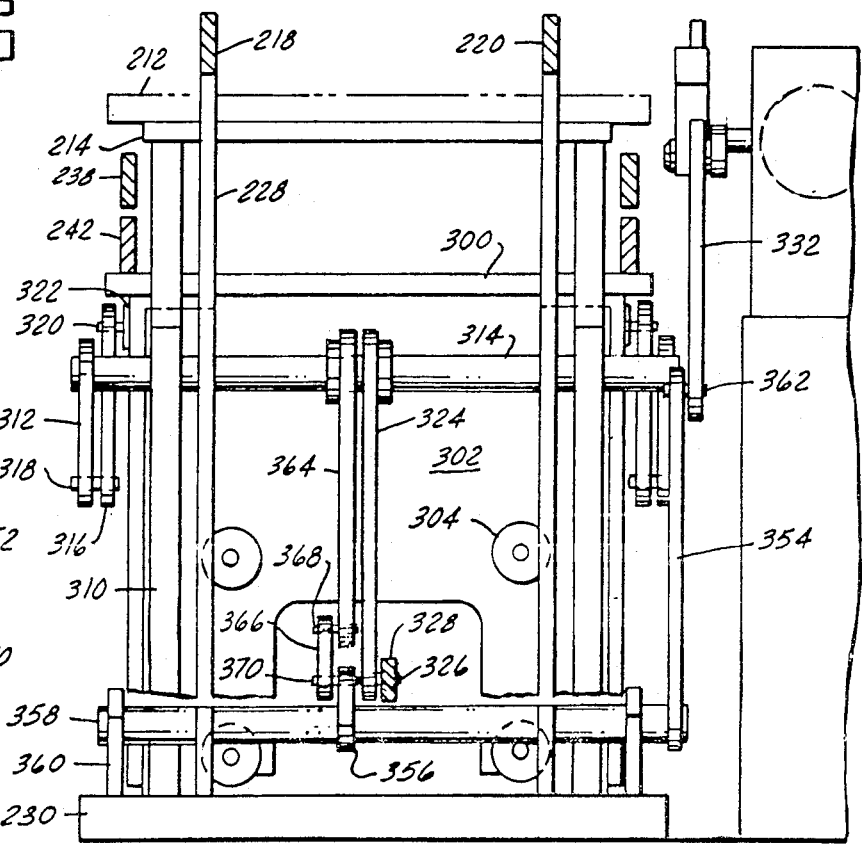

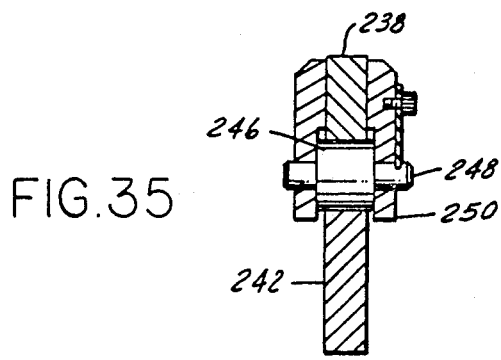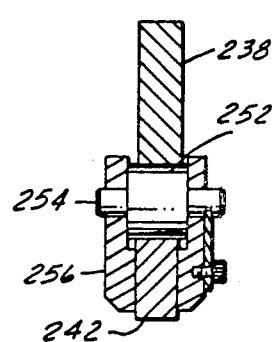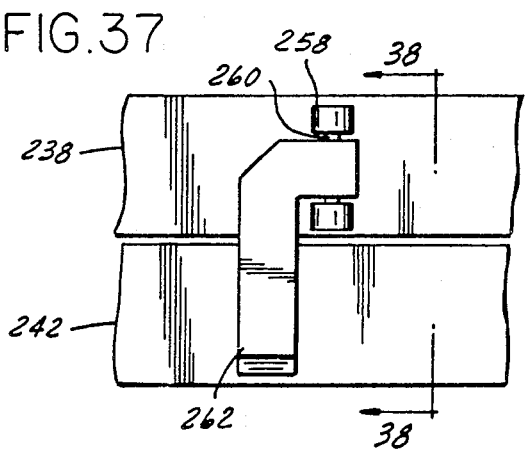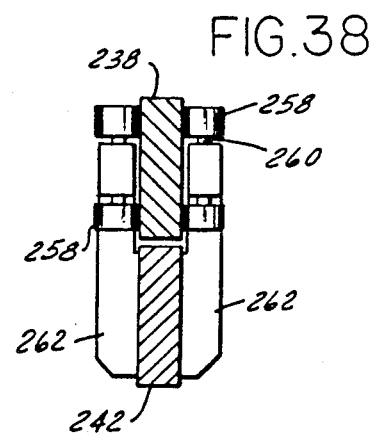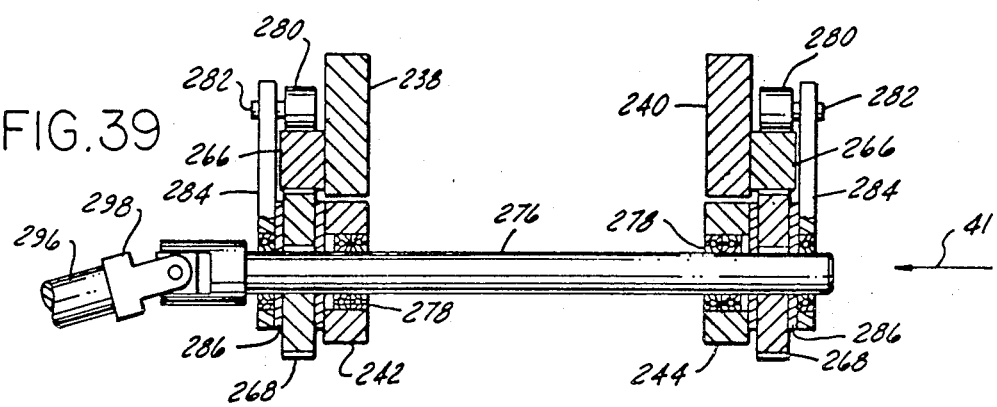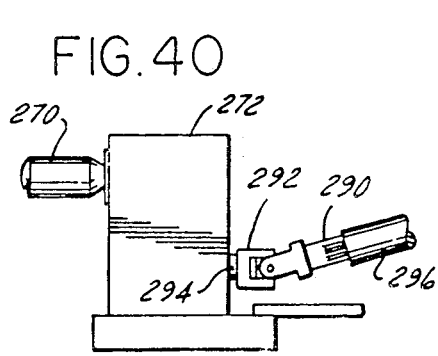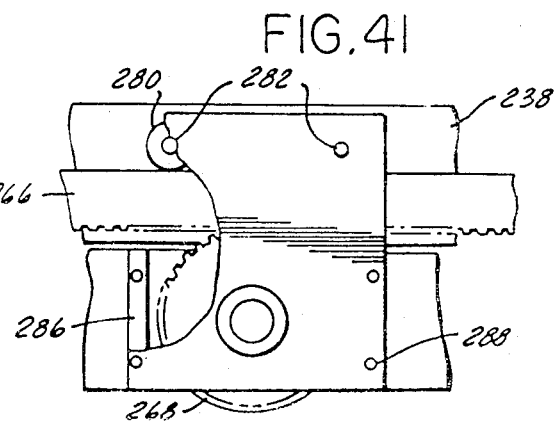

WORKPIECE TRANSFER SYSTEM

REFERENCE TO CO-PENDING APPLICATION

This is a divisional application of co-pending U.S. patent application Ser. No. 763,350 filed on Aug. 7, 1985, now U.S. Pat. No. 4,750,605.

FIELD

This invention relates to workpiece processing lines having multiple stations, and more particularly to a system for transferring workpieces from one line or device to another.

BACKGROUND

Various devices are known that lift and carry workpieces from one station to another. When transferring workpieces into or out of such devices, or from one such device to another, it is usually necessary to precisely synchronize the movement of the devices. Failure to do so usually results in improper transfer of workpieces, failure to transfer workpieces and/or interference or collision of workpieces and/or the devices themselves. Frequently, such devices jar, shock or shift the location of workpieces when they are transferred rapidly.

In some applications, it is also very desirable or even necessary that workpieces be advanced generally horizontally through portions or segments of a processing line at different vertical heights. Frequently, workpieces must be transferred vertically from one height to another because the height to which a workpiece can be manually lifted, due to its weight, is less than the height necessary for performing manufacturing and/or assembly operations. These applications usually present a critical need for and difficult problems in synchronizing the devices moving the workpiece through the transition from one vertical height to another.

SUMMARY

An apparatus for transferring a workpiece from a station at one height in a workpiece support or transfer device to a station at another height in another transfer device or support. The workpiece is moved vertically by an elevator which is movable along a path from a point below the lower station to a point above the upper station. To smoothly and rapidly move each workpiece the instantaneous speed of the elevator is varied by a drive mechanism which at least provides one dwell when the workpiece is picked up in one station and another dwell when the workpiece is deposited in the other station. To avoid interference or collision of workpieces and or the transfer mechanism and to eliminate the need for precise synchronization and timing of the transfer mechanism, the elevator, when in its upper and lower positions, is clear of and does not interfere with any transfer mechanisms, supports, and any workpieces in the stations.

Some of the objects, features and advantages of this invention are to provide an apparatus for transferring workpieces generally vertically from one support or transfer mechanism to another which eliminates the need for precise synchronization, eliminates interference and collision between workpieces and/or transfer mechanisms, permits transfer mechanisms to operate substantially independently of each other, smoothly and rapidly transfers workpieces generally vertically without jarring, shocking or mislocating them, and is rugged, durable, reliable, relatively service and maintenance-free, of relatively simple design and of economical manufacture and assembly.

BRIEF DESCRIPTION OF THE DRAWINGS

These and other objects, features and advantages of this invention will be apparent from the following detailed description, appended claims and accompanying drawings in which:

FIG. 1 is a schematic perspective view of a device embodying this invention having a pair of horizontal transfer mechanisms and a vertical elevator;

FIG. 2 is a schematic view of the device of FIG. 1 showing the elevator in the raised position and the upper transfer mechanism retracted to underlie the workpiece carried by the elevator;

FIGS. 3 through 11 are schematic views of the device of FIG. 1 showing various portions of the cycle of the transfer mechanisms and the elevator;

FIG. 12 is a side view of one form of an elevator of the device of FIG. 1;

FIG. 13 is a side view of another form of an elevator of the device of FIG. 1;

FIG. 14 is a side view of one form of a drive for the elevators with a plurality of cylinders;

FIGS. 15 through 17 are side views showing the drive of FIG. 14 with various cylinders extended;

FIG. 18 is a fragmentary side view of another form of drive connected to the elevator of FIG. 12;

FIG. 19 is a fragmentary sectional view taken generally on line 19—19 of FIG. 18;

FIG. 20 is a fragmentary end view of a further form of a drive connected to the elevator of FIG. 12;

FIG. 21 is a side view of another drive for the elevator of FIG. 12;

FIG. 22 is a schematic diagram of various positions of some of the component parts of the drive of FIG. 21;

FIG. 23 is a fragmentary side view of a modified form of the drive of FIG. 21 for the elevator of FIG. 12;

FIG. 24 is a schematic diagram of various positions of some of the component parts of the drive of FIG. 23;

FIG. 25 is a fragmentary sectional view of a further drive for the elevator of FIG. 12;

FIG. 26 is a fragmentary side view of the drive of FIG. 25;

FIG. 27 is a fragmentary side view similar to FIG. 26 showing some of the component parts of the drive of FIG. 25 arranged in another position;

FIG. 28 is a side view of a triple lift conveyor embodying this invention shown in its fully lowered position;

FIG. 29 is a side view with portions broken away of the conveyor of FIG. 28 shown in its fully raised position;

FIG. 30 is a sectional view taken generally on line 30—30 of FIG. 28;

FIG. 31 is a fragmentary sectional view taken generally on line 31—31 of FIG. 30;

FIG. 32 is a sectional view taken generally on line 32—32 of FIG. 31;

FIG. 33 is a fragmentary sectional view taken generally on line 33—33 of FIG. 28;

FIG. 34 is a sectional view with portions broken away taken generally on line 34—34 of FIG. 28;

FIG. 35 is a sectional view taken generally on line 35—35 of FIG. 28;

FIG. 36 is a sectional view taken generally on line 36—36 of FIG. 28;

FIG. 37 is an enlarged and fragmentary side view of the shuttle rails and guide rollers of the conveyor of FIG. 28;

FIG. 38 is a sectional view taken on line 38—38 of FIG. 37;

FIG. 39 is a sectional view taken on line 39—39 of FIG. 28;

FIG. 40 is a fragmentary side view of the drive for the shuttle rails of the conveyor of FIG. 28;

FIG. 41 is a fragmentary side view taken generally in the direction of the arrow 41 of FIG. 39 and showing a shuttle rail and part of its drive mechanism of the conveyor of FIG. 28.

DETAILED DESCRIPTION

Figure 42:
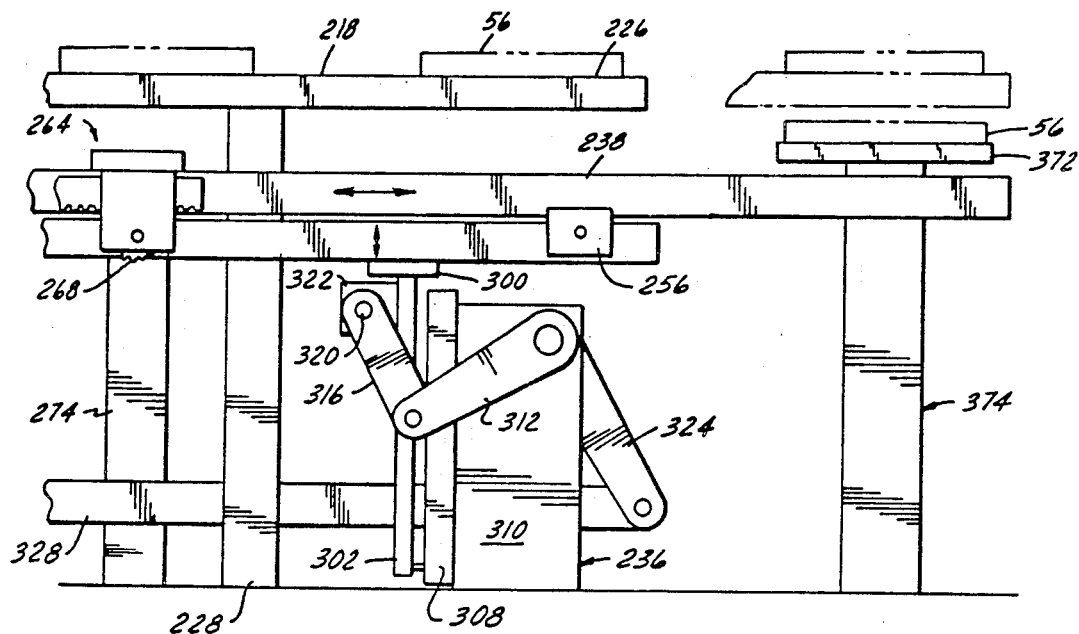
FIG. 42 is a fragmentary side view of a workpiece unloading station and support for the conveyor of FIG. 28.

FIGS. 1 an 2 schematically illustrate a workpiece processing line 50 embodying this invention. The line has a pair of workpiece transfer mechanisms 52 and 54 which advance workpieces 56 in the direction of the arrows 58 and a vertically reciprocable elevator 60. The transfer mechanisms 52 and 54 can be conventional lift and carry conveyors with shuttles 62 and 64 each having a pair of spaced apart beams or workpiece transfer rails 66 and 68. The transfers 52 and 54 can be inclined at an angle to each other, as shown in FIGS. 1 and 2, such as when a processing line turns a corner, or in line with each other, as shown in FIGS. 3 through 11, so that each workpiece is advanced in essentially the same direction throughout the processing line.

In accordance with this invention, to eliminate interference, collisions and the need for precise synchronization of the transfers 52 and 54, they are vertically spaced apart so that there is clearance between their shuttles when they are superimposed as shown in FIG. 2. Preferably, to avoid interference and the need for precise synchronization, the elevator 60 and its workpiece locator and carrier pad 70 are constructed and arranged so that they can pass between the rails of both shuttles when they overlie the elevator. To insure that the elevator 60 will not interfere with the advancing of the workpiece 56 by the shuttle 62 of the lower transfer into a station over the elevator, there is a clearance between them when the elevator is in its lowest or fully retracted position shown in FIG. 1. To insure that the elevator will not interfere with the shuttle of the upper transfer 54 as it is retracted so that it will underlie and receive the workpiece, there is a clearance between the retracted shuttle and the elevator carrier pad 70 (and the workpiece thereon) when the elevator is in its fully raised or highest position shown in FIG. 2.

In accordance with another feature of this invention, the elevator gently picks up and deposits workpieces without jarring or shocking them while still rapidly moving them from one transfer to another. This is accomplished by accelerating and decelerating the elevator so that it dwells at least when picking up and depositing a workpiece on a shuttle. When the elevator dwells, its instantaneous speed is at least greatly reduced and desirably approaches zero compared to its average speed when moving the workpiece between the stations. Preferably, in these dwells the elevator actually stops momentarily. Preferably, each time the elevator comes to a stop, it decelerates smoothly and each time it starts, it accelerates smoothly to prevent jarring and shocking of both the workpieces and of the elevator mechanism itself.

CYCLE

The cycle or sequence of steps of the shuttles of the transfers and of the elevator, to advance and transfer a workpiece 56 from the lower transfer 52 to the upper transfer 54 are schematically shown in FIGS. 3 through 11. As shown in FIG. 3, initially the shuttle 62 of the lower transfer 52 is retracted with a workpiece 56 in its station 72, the elevator 60 is fully retracted in its lowermost position, and the shuttle 64 of the upper transfer is extended and has no workpiece in its station 74. As shown in FIG. 4, with the elevator 60 retracted, the shuttle 62 of the lower transfer 52 is extended to move the workpiece 56 into a position 76 overlying and spaced above the elevator. Extending shuttle 62 also advances by one station each of the other workpieces 56' on the lower transfer 52.

As shown in FIG. 5, the elevator 60 is then partially raised one increment and dwells in the intermediate position 76 to engage the workpiece 56. After engaging the workpiece, the elevator is further extended upward to pick up and remove the workpiece from the shuttle 62 of the lower transfer. The elevator raises the workpiece through the intermediate position 78 aligned with the upper transfer mechanism 54 to the fully raised position of the elevator shown in FIG. 7 above the upper transfer 64 where the elevator dwells or stops. Optionally, but not necessarily, the elevator can also dwell in the intermediate position 78 as shown in FIG. 6. This dwell in the position 78 frequently simplifies the construction and arrangement of the drive for the elevator without significantly increasing the time required to move the workpiece from the lower to the upper transfer mechanism.

As shown in FIG. 8, with the elevator fully raised, the shuttle 64 of the upper transfer is retracted so that it enters the position 78 and underlies the workpiece 56. Thereafter, the elevator 60 is partially retracted and, as shown in FIG. 9, dwells in the intermediate position 78 to deposit the workpiece 56 on the shuttle 64 of the upper transfer.

Thereafter, as shown in FIG. 11, the elevator is retracted to its fully lowered position with an optional dwell in the intermediate position 76, as shown in FIG. 10, which frequently simplifies construction of the drive mechanism. Once the elevator has been retracted sufficiently to disengage and clear the workpiece and the upper shuttle 64, such as shown in FIG. 10, the upper shuttle 64 is extended to remove the workpiece from the intermediate position 78 and advance it as shown in FIG. 11. This extending of the shuttle 64 also advances one station all other workpieces on the upper transfer mechanism 54.

The shuttle 62 of the lower transfer can be retracted as early in the sequence as when the elevator has been moved upward to the intermediate position 76 as shown in FIG. 6. However, in some applications, to insure that even if the lower transfer mechanism 52 malfunctions, a workpiece is not advanced into the position 76 until the elevator 60 has been retracted, it may be preferable to retract the lower shuttle 62 only after the elevator returns to its fully lowered position as shown in FIG. 11.

As will be apparent from this sequence of operations, in accordance with another feature of this invention, it is not necessary to precisely synchronize or time the movement of the transfers 52 and 54 with each other or with the movement of the elevator 60. Furthermore, each transfer mechanism and the elevator can be operated with its own independent drive mechanism which can be energized and cycled by a relatively simple control system of conventional limit switches or proximity sensors and control circuitry not shown. Also, this invention can be used to advance a workpiece from a higher to a lower transfer mechanism.

ELEVATOR

As shown in FIG. 12, elevator 60 has a vertical slide 82 mounted for reciprocation by four guide rollers 84 secured to an upstanding support plate 86 fixed to a base 88. The workpiece carrier pad 70 is fixed to the upper end of the slide 82. The slide 82 is driven through a bell crank 90 pivotally mounted intermediate its ends at 92 on a support 94 fixed to the base. The slide is connected to the bell crank by a link 96 pivotally connected adjacent one end at 98 to the slide and adjacent the other end at 100 to one end of the bell crank. A drive mechanism is connected to the bell crank by a link 102 pivotally connected adjacent one end at 104 to the other end of the bell crank.

Another form of an elevator 106 is shown in FIG. 13 in which the workpiece carrier pad 70 is fixed to the upper end of a carrier link 108 which is supported and reciprocated vertically with a straight line motion by two classical Scott Russell linkages. These linkages have two levers 110 and 112 each pivotally connected adjacent one end at 114 and 116 to the carrier link 108, and each having at the other end a follower 118 and 120, each received in a horizontally extending slot or slide 122 and 124 in a vertical support 126 fixed to a base 128. The levers 110 and 112 are also supported by links 130 and 132 pivotally connected adjacent one end at 134 and 136 to the mid-points of the levers and adjacent the other end at 138 and 140 to an upright support 142 fixed to the base 128. The linkages are connected to a drive through an extension arm 144 of the lower link 132 which is pivotally connected at 146 to a drive link 148.

ELEVATOR DRIVE

A variety of drives may be used to impart the desired motion and dwells to the elevator. Workpieces will be properly transferred when the elevator 60 or 106 is operated with dwells at two intermediate levels on the way up, as shown in FIGS. 5 and 6, and dwells at two intermediate levels on the way down, as shown in FIGS. 9 and 10. However, it is apparent that the higher dwell position on the way up, FIG. 6, and the lower dwell position on the way down, FIG. 10, are unnecessary to accomplish the objective of gently picking up and depositing workpieces without shocking or jarring them. This can be accomplished by having a dwell at only those intermediate positions at which a workpiece is picked up or deposited by the elevator. The inclusion of the unnecessary dwells is usually acceptable and sometimes simplifies construction of the drive. However, if minimization of cycle time is desired, it is better to utilize a drive which eliminates the unnecessary dwells.

FIGS. 14 through 17 illustrate a suitable drive 150 which can be cycled to operate the elevators 60 and 106 either with or without the unnecessary dwells. Drive 150 has three hydraulic or pneumatic cylinders 152, 154 and 156, all of which are shown in the fully extended position in FIG. 17. The cylinders are linked together in tandem with the piston rod 158 of the cylinder 152 fixed to the body of the cylinder 154 and the piston rod 160 of the cylinder 154 fixed to the body of the cylinder 156. The piston rod 162 of the cylinder 156 is connected in lieu of the link 102 or 148 to the elevator 60 or 106. To provide the desired acceleration, deceleration and dwells for the elevators, the cylinders are cushioned preferably at both ends of their strokes so that at the mid-point of their strokes, they will have a relatively fast instantaneous speed and will decelerate or slow down and come to a stop at each end of their strokes.

Through appropriate conventional four-way valves and electropneumatic or electrohydraulic circuitry not shown, the cylinders can be cycled and controlled to impart the desired motion to the elevators. For example, when the piston rods of all three cylinders are extended, as shown in FIG. 17, the elevators will be in their fully lowered positions, as shown in FIGS. 3 and 11. When the piston rod of one cylinder is retracted, such as that of cylinder 152, as shown in FIG. 16, the elevator will be moved to the lower intermediate position 76, as shown in FIGS. 5 and 10. When the piston rods of two of the cylinders are retracted, such as the cylinders 152 and 154, as shown in FIG. 15, the elevators will be moved to the upper intermediate position 78, as shown in FIGS. 6 and 9. When the piston rods of all three cylinders are fully retracted, as shown in FIG. 14, the elevators will be in the fully raised position as shown in FIGS. 7 and 8.

If it is desired to greatly reduce or substantially eliminate the dwell shown in FIGS. 6 and 10 of the elevators, two of the cylinders can be energized either simultaneously so that they are both extending or retracting at the same time or sequentially so that the second cylinder begins to be either extended or retracted before the extension or retraction of the first cylinder is completed.

Another drive 170 for the elevators is shown in FIG. 18 connected to the elevator 60. This drive utilizes a Geneva movement to impart motion to the elevator and all four of the dwells shown in FIGS. 5, 6, 9 and 10. A Geneva sector 172 is pivotally mounted at 174 on a support bracket 176 fixed to the base. The Geneva sector is connected to the slide 82 by a link 178 pivotally connected adjacent one end at 180 to the slide and adjacent the other end at 182 to an arm of the Geneva sector. The sector is driven by a reversible electric motor 184 through a speed reducer gear box 186 and a disc 188 on the output shaft 190 of the gear box. The gear box is mounted on the base. As shown in FIGS. 18 and 19, two concentric pins or cams 194 are fixed in diametrically opposed relation on the disc and engage in follower slots 196 in the sector 172 to move the sector in discrete angular increments each with a harmonic motion and a momentary dwell when the disc is rotated at a constant speed by the motor.

The sector 172 will be moved through one discrete angular increment for each one-half revolution of the disc 188 which is rotated in one direction (counterclockwise as shown in FIG. 18) to raise the elevator and in the opposite direction (clockwise in FIG. 18) to lower the elevator. Thus, the desired motion can be imparted to the elevator by operating the motor to rotate the disc in the desired direction for the number of half revolutions needed to impart the desired motion to the elevator. For example, counterclockwise rotation of the disc 188 for three half revolutions will sequentially and incrementally raise the elevator to the lower intermediate position 76, upper intermediate position 78 and fully raised position. Then clockwise rotation of the disc for three half revolutions will sequentially and incrementally lower the elevator to the upper intermediate position 78, lower intermediate position 76 and fully lowered position.

FIG. 20 shows a modified form 198 of the Geneva drive 170 of FIG. 18 in which the Geneva sector 172 and link 178 are replaced by a Geneva rack 200 which is fixed to the slide 82 of the elevator. The rack has follower slots 196 which engage the cam pins 194 on the disc 188. This modified drive 198 functions in essentially the same way as the drive 170 and hence its function and operation will not be further described.

FIG. 21 shows another Geneva drive 400 for the elevators which eliminates the unnecessary dwells shown in FIGS. 6 and 10. A driven wheel 402 is journaled for rotation on its axis and has four radial slots 404 located ninety degrees apart which are engaged by rollers 406 carried by and located ninety degrees apart on a driver 408. The driver 408 is fixed to an output shaft 410 of a prime mover, such as an electric motor and gear reducer (not shown). Each time the driver 408 moves one-quarter of a revolution in one direction, it indexes the driven wheel 402 one quarter of a revolution in the opposite direction with an accelerating- decelerating angular motion with a momentary dwell. The driven wheel 402 is connected to the drive link 102 of the elevator 60 by a crank 411. Crank 411 is pivotally connected at one end to link 102 by a crankpin 412 and fixed at the other end to the driven wheel for rotation therewith.

As shown in FIGS. 21 and 22, when the elevator 60 is in its fully lowered position, the crankpin 412 is located at 414. The elevator is raised to its lower intermediate position 76 by rotating the driven wheel 402 one-quarter of a revolution clockwise so that the crankpin is located at 416. The elevator is moved to its fully raised position when the driven wheel is rotated another quarter of a revolution clockwise so the crankpin is located at 418. The elevator is lowered to its upper intermediate position 78 when the driven wheel is advanced another quarter of a revolution so that the crankpin is located at 420. The elevator is returned to its fully lowered position when the driven wheel is advanced clockwise another quarter of a revolution so the crankpin is again located at 414. Thus, each full revolution of the crankpin 412 by the drive 400 moves the elevator through one complete cycle without the dwells shown in FIGS. 6 and 10. This drive can be rotated in the same direction for each complete cycle of the elevator and does not require a reversible prime mover or motor.

With drive 400, the location of the intermediate positions 76,78 of the elevator is a function of the angle 422 or phase relationship between the crank arm 411 or crankpin 412 and the slots 404 in the driven wheels 402. With the phase relationship shown in FIGS. 21 and 22 the intermediate position 76 to which the elevator is moved when raised will be lower than the intermediate position 78 to which the elevator is moved when lowered. In effect the crankpin 412 lags a dwell point of the wheel 402 by the extent of the angle 422.

However, as shown in FIGS. 23 and 24, if the phase relationship is shifted to the angle 424, the location of the intermediate position 76 is moved or raised above the intermediate position 78. In effect the crankpin 412 leads the dwell point of the wheel 402 by the extent of the angle 424. With the angular position 424 of the crankpin, the elevator is in its fully lowered position when the crankpin is located at 414', is raised to the intermediate position 76 when the crankpin is located at 416', is raised to the upper position when the crankpin is located at 418', is lowered to the intermediate position 78 when the crankpin is located at 420', and is fully lowered when the crankpin is again located at 414'. The magnitude of the phase angle is dependent on the distance between the intermediate levels and the specific design of the linkages. For most applications, these phase shifts or angles 422,424 are at least 10° and usually about 15° to 30°. It will be apparent to skilled persons that with drive 400 the location of the intermediate positions 76,78 of the elevator can also be reversed by reversing the direction of rotation of the driven wheel 402 such as by reversing the direction of rotation of the prime mover.

Another drive 430 for the elevators is shown in FIGS. 25 and 26 which also moves the elevator with an accelerating-decelerating motion while eliminating the unnecessary dwells shown in FIGS. 6 and 10. This drive has a base 432 on which a carrier arm 434 is journaled for rotation by bearings 436. The arm is rotated by the cooperation of timing sprockets 438 and 440 which are connected by a chain 442. The sprocket 438 is fixed to the base 432 and the sprocket 440 is secured to a shaft 443 journaled by bearings 444 in the carrier arm for rotation on its axis which is parallel to and spaced from the axis of rotation of the carrier arm. To rotate the arm, the sprocket 440 is driven by a prime mover, such as an electric motor and gear reducer (not shown), through a drive shaft 446, journaled by bearings 448 in the base. The sprocket 440 is coupled to the drive shaft 446 by a chain 450 received on sprockets 452 and 454 fixed to the shafts 443 and 446. This drive is connected to the elevator 60 by the link 102. The link 102 is pivotally connected to the drive 430 by a crankpin 456 which is fixedly mounted on the sprocket 452 so that it is eccentric to the axis of the sprocket 440.

When the shaft 446 is rotated, the crankpin 456 will move along a substantially rectilinear path 458 shown in FIG. 26, with dwells in the corners and an accelerating-decelerating motion along the path between the corners, if the ratio of the pitch diameter and number of teeth of the sprockets 440 and 438 is 1:4. With this ratio, each full revolution of the sprocket 440 will advance the crankpin 90° or through one-quarter of its path 458.

When the shaft 446 is rotated counter-clockwise as viewed in FIG. 26, the crankpin 456 moves clockwise around the path 458. When the elevator 60 is in its fully lowered position, the crankpin 456 is located at 460 (FIG. 26), and is raised to its intermediate position 76, when the crankpin is located at 462. The elevator is moved to its fully raised position when the crankpin is located at 464 and is lowered to its intermediate position 78, when the crankpin is located at 466. The elevator is returned to its fully lowered position when the crankpin is advanced to return to the location 460.

The location of the intermediate positions 76 and 78 to which the elevator is raised and lowered, is a function of the angle of the centerline of the arm 434 with the center of the crankpin thereon to a reference line 467 intersecting the axis on which the arm rotates. Reference line 467 is perpendicular to the average position of the longitudinal axis of the link 102. The intermediate position 76 of the elevator is lower than its intermediate position 78 when the crankpin is located clockwise of the reference line 467 at the angle 468 as shown in FIG. 26.

The angle of the crankpin can also be adjusted so the intermediate position 76 is above the intermediate position 78 by rotating the crankpin and sprocket 440 relative to the sprocket 438 so the crankpin is located counterclockwise of the reference line at the angle 470 shown in FIG. 27. With angle 470 the elevator is fully lowered when the crankpin is located at 460', is raised to the intermediate position 76 when the crankpin is located at 462', is fully raised when the crankpin is located at 464', is lowered to its intermediate position 78 when the crankpin is located at 466' and is returned to its fully lowered position when the crankpin is returned to the position 460'. For most applications the angles 468 and 470 of the drive are at least 10° and usually in the range of about 15° to 30°.

The construction and operation of the drive 430 is fully disclosed and described in Brems U.S. Pat. No. 3,789,676, the disclosure of which is incorporated herein by reference and hence this drive will not be described in further detail.

LIFT AND CARRY TRANSFER

FIG. 28 shows a workpiece lift and carry conveyor apparatus 210 in which this invention is embodied to load workpieces 212 into the conveyor. Each workpiece 212 is manually placed on a locator and support platform 214 which is at a convenient height for manually lifting and placing the workpiece on the platform. Thereafter, each workpiece is lifted from the platform by the apparatus, advanced, and deposited in a station 216 on workpiece support rails 218 and 220 which are above the platform and at a convenient height for manufacturing and/or assembly operations in various stations 222, 224 and 226 along the rails. The rails 218 and 220 are carried by two upright supports 228 fixed to a base 230.

The workpieces are advanced to the various stations by a shuttle 232 which is received on and raised and lowered by an elevator 234 carried by three tower assemblies 236 fixed to the base. As shown in FIGS. 28 and 30, the shuttle 232 has a pair of laterally spaced apart carrier rails 238 and 240 which are carried for reciprocation by tracks or rails 242 and 244 of the elevator. As shown in FIGS. 28 and 35, the shuttle rails 238, 240 adjacent one end ride on their associated tracks 242, 244 through rollers 246 journalled on pins 248 carried by brackets 250 secured to the rails. As shown in FIGS. 28 and 36 adjacent the other end, the shuttle rails are supported on the elevator tracks through rollers 252 journalled on pins 254 carried by brackets 256 secured to the conveyor tracks. As shown in FIGS. 37 and 38 each shuttle rail is also retained in its upright position by at least two longitudinally spaced sets of rollers 258 secured to a shaft 260 journaled in brackets 262 secured to the associated elevator rails.

As shown in FIG. 28, the shuttle rails are reciprocated by a drive mechanism 264 through racks 266 meshed with gears 268 driven by a reversible electric motor 270 through a speed reducer gear box 272 secured to a pedestal 274 fixed to the base 230. As shown in FIG. 39, the gears 268 are keyed to a driven shaft 276 journaled for rotation by bearings 278 carried by the elevator rails 242 and 244. As shown in FIG. 41, each rack is retained in meshed relationship with its associated gear by a pair of rollers 280 journaled on stub shafts 282 secured to a carrier plate 284 which along with spacer blocks 286 is secured by cap screws 288 to its associated elevator rail.

As shown in FIGS. 39 and 40, the gear box 272 is drivingly connected to the shaft 276, while still permitting the shuttle to be raised or lowered, by a spine 290 connected by a universal joint 292 to the output shaft 294 of the gear box and slidably received in a mating spined coupling tube 296 connected by a universal joint 298 to the shaft 276 for rotating the gears 268 meshed with the racks 266.

As shown in FIGS. 28 and 30 the support rails or tracks 240 and 242 of the elevator are fixed to three carrier plates 300 each secured to the upper end of a slide plate 302 of one of the towers 236. Each slide plate is mounted to be reciprocated generally vertically by four rollers 304 journaled for rotation on stub shafts 306 (FIG. 31) secured to the slide plate and having a V-shape groove engagable with a pair of complementary V-shape ways or tracks 308. Each track 308 is fixed to an upright support 310 fixed to the base 230.

The slides are reciprocated on the tracks by levers 312 fixed at one end to a shaft 314 journaled for rotation in the upright supports 310 and connected by links 316 to the slide plate. Each link 316 is pivotally connected adjacent one end at 318 to the lever 312 and at the other end to the slide by a pivot pin 320 carried by a block 322 fixed to the slide. Each shaft 314 is turned by an arm 324 which is fixed adjacent one end to the shaft and pivotally connected adjacent the other end at 326 to a drag link 328 so that movement of the drag link simultaneously activates the assemblies of all three towers to raise or lower the elevator.

As shown in FIG. 28 the elevator is driven by a cycloidal drive mechanism 330 which has a rack 332 and a drive gear 334 driven by a reversible electric motor 336 through a speed reducer gear box 338 mounted on a support column 340. As shown in FIG. 33, the drive gear 334 is connected to the output shaft 342 of the gear box through a crank 344 having a journal 346 on which the gear 334 is keyed for rotation with the crank. The rack is held in mesh with the gear by a hooked retainer 348 which is also received for rotation on the journal and retained thereon by a washer 350 and a bolt 352 threaded into the end of the journal.

So that when crank 344 makes one complete revolution, the rack 332 will be moved an increment or distance equal to the pitch circumference of the drive gear 334 and the profile of the instantaneous speed or velocity of the rack will be cycloidal with a dwell at each end of the increment, the throw of the crank 344 is such that the axis of the output shaft 342 is substantially in line with or intersects the pitch line of the gear 334.

The rack 332 is operably connected to the elevator mechanism through levers 354 and 356 (FIGS. 28 and 29) each fixed at one end to a common shaft 358 journaled in supports 360 fixed to the base. The lever 354 is connected adjacent its other end at 362 to the rack 332. The lever 356 is operably connected to the shaft 314 of the center tower 236 through a lever 364 fixed at one end to the shaft and a link 366 pivotally connected at 368 to the lever 364 and at 370 to the lever 356.

When the elevator 234 is in the fully lowered position as shown in FIG. 28, the shuttle 232 is also in the lowermost position as shown in phantom at A in FIG. 29 and the lever 354 is in the position indicated by A'. When the output shaft 342 and crank 344 of the cycloidal drive 330 are rotated one revolution counterclockwise (as viewed in FIG. 28), the lever 354 is moved to the position B' and the shuttle is raised by the elevator one increment to the position B, as shown in phantom in FIG. 29. A second revolution of the output shaft and crank 344 moves the lever 354 to the position C' and raises the shuttle another increment to the position shown in phantom at C, and a third revolution of the crank moves the lever 354 to the position D' to fully raise the elevator and move the shuttle another increment to the position D, as shown in FIG. 29. Rotation of the output shaft and crank 344 in the opposite direction (clockwise in FIG. 28) lowers the shuttle in three discrete increments or steps (one for each revolution) to the positions C, B and A as the lever 354 is moved to the positions C', B' and A' respectively. A dwell is provided at both ends of each increment of movement by the cycloidal drive.

This cycloidal drive mechanism is disclosed and claimed in Brems U.S. Pat. No. 3,789,676 issued on Feb. 5, 1974, the disclosure of which is incorporated herein by reference, and hence this drive mechanism will not be described in further detail. Other embodiments of this cycloidal drive mechanism shown in U.S. Pat. No. 3,789,676 can also be used to produce the desired three step movement of the elevator.

In operation of the transfer apparatus 210, initially the shuttle 232 is fully retracted and the elevator 234 is fully lowered as shown in FIG. 28. When the elevator is fully lowered, the shuttle 232 is at the vertical height shown in phantom at A in FIG. 29 and the lever 354 operating the conveyor is in the position indicated at A'. A workpiece 212 is manually placed on the locator support platform 214.

The cycloidal drive 330 is energized to rotate the crank 344 one revolution counter-clockwise (as viewed in FIG. 28) which through the cooperation of gear 334 and rack 332 moves the lever 354 to the position indicated at B' in FIG. 29, and raises the elevator to lift the shuttle to the position shown in phantom at B to engage the workpiece 212 resting on the support 214.

The next complete counter-clockwise revolution of the crank 344 causes the elevator to raise the shuttle to the position designated C which picks up and raises the workpiece 212 from the support 214. This increment of movement also positions the shuttle rails 238 and 240 to engage all workpieces resting on the fixed support rails 218 and 220.

The next complete counter-clockwise revolution of the crank 344 causes the elevator to move the shuttle 332 to the fully raised position shown at D which raises all the workpieces above and clear of the fixed support rails 218 and 220.

With the elevator and shuttle in this fully raised position, the shuttle rails are extended (or traversed to the right as viewed in FIGS. 28 and 29), to advance one station all the workpieces carried by the shuttle, by energizing the drive 264 to rotate the gears 268 meshed with the racks 266 clockwise as viewed in FIG. 28.

After the shuttle has been extended, the cycloidal drive 330 is energized to rotate the crank 344 clockwise one complete revolution (as viewed in FIG. 28) which moves the lever 354 to the position C' to lower the elevator 234 one increment so that the extended shuttle 232 is at the vertical height C. This deposits the workpieces on the fixed support rails 218, 220. The next revolution of the crank 334 moves the lever 354 to the position B' which lowers the elevator one increment so that the extended shuttle is at the vertical height B. This disengages the shuttle from the workpieces and clears it from the fixed support rails 218, 220.

The next complete clockwise revolution the crank 344 moves the lever 354 to the position A' which fully lowers the elevator and moves the extended shuttle 232 to the vertical height A. Preferably, the shuttle rails are then retracted and returned to the position shown in FIG. 28 underlying the workpiece support 14 by energizing the drive 264 to rotate gears 268 counter-clockwise as viewed in FIG. 28 to retract the shuttle. However, the shuttle can be retracted any time after its rails have been moved below the position B or even below the position C so long as no workpiece is placed on the support 214 until the elevator moves the shuttle rail below the position which corresponds to the upper face of the workpiece support. After the shuttle is retracted and lowered, another workpiece can be placed on the support 214 and then the transfer 210 is ready to be cycled again. To provide ample time for loading the workpiece, it can be placed on the support 214 any time after the shuttle is at least fully raised, and preferably extended, so long as the shuttle is not retracted until after its rails are lowered below the position B, so that when the rails are returned they will clear a workpiece on the platform.

It will be appreciated that workpieces can be unloaded from the transfer 210 by placing another workpiece support platform 372 at the discharge or downstream end of the transfer as shown in FIG. 42. Preferably, but not necessarily, the unloading platform 372 is at substantially the same vertical height as the loading platform 214. When workpieces are unloaded onto the platform 372, the shuttle is retracted only after the elevator has lowered the shuttle rails below the position B i.e. so that a workpiece will be deposited on the platform 372 before the shuttle is retracted. The platform 372 is secured to the top of a support pedestal 374 fixed to the base 230.

It is further clear that the cycloidal drive mechanism can be employed to drive the elevator 60 of the line 50 of FIGS. 1 to 13; and conversely that, to one skilled in these arts, the drives illustrated in FIGS. 14 to 27 can be applied to the lift and carry transfer conveyor 210 shown in FIGS. 28–32 and 34–42 to achieve a lift system in which the shuttle is moved to four different levels.

We claim:

1. A multiple station workpiece processing line comprising:
 a lower station constructed and arranged to receive a workpiece, an upper station constructed and arranged to receive a workpiece, said stations being generally vertically spaced apart, an elevator, a workpiece transfer mechanism carried by said elevator for movement generally vertically in unison therewith and having a shuttle movable substantially in a straight line horizontally and constructed and arranged to move the workpiece substantially horizontally to advance such workpiece with respect to said elevator, said elevator being constructed and arranged to move said transfer mechanism generally vertically through at least one of said stations in substantially a straight line between a first position below said lower station and a second position wherein said transfer mechanism is vertically spaced above said upper station, a workpiece support associated with one of said stations and constructed and arranged to receive and support a workpiece therein independently of said elevator and workpiece transfer mechanism, said elevator and transfer mechanism when in said first position being spaced vertically from said lower station sufficiently such that a workpiece can be transferred one of into or out of said lower station independently of said elevator and transfer mechanism and without interference therewith, said elevator and transfer mechanism when in said second position being spaced vertically sufficiently from said upper station to clear any means for receiving and supporting a workpiece in said upper station independently of said elevator and transfer mechanism and without interference therewith, at least three of said first position, lower station, upper station and second position being superimposed and vertically spaced apart, a drive operably connected to said transfer mechanism for driving said transfer mechanism to advance a workpiece in substantially a straight line horizontally while said elevator is in said second position, and a drive operably connected with said elevator for moving said elevator and said transfer mechanism in substantially a straight line vertically between said first and second positions and constructed and arranged to greatly reduce the instantaneous speed of said elevator to at least close to zero when moving between said stations to produce a dwell when said elevator and transfer mechanism picks up a workpiece in one of said stations, to rapidly increase the speed relative to such dwell of said elevator and transfer mechanism after picking up such workpiece, to greatly reduce the speed to at least close to zero of said elevator and transfer mechanism to provide another dwell when said elevator and transfer mechanism deposits such workpiece in said other station, and to rapidly increase the speed relative to such another dwell of said elevator and transfer mechanism after depositing such workpiece, whereby workpieces are smoothly picked up in one of said stations, advanced by said transfer mechanism and deposited in the other of said stations.

2. The line of claim 1 wherein said workpiece support is associated with and fixed in said lower station and constructed and arranged to receive and support a workpiece in said lower station such that said elevator can pick up a workpiece in said lower station from said support.

3. The line of claim 1 wherein said workpiece support is associated with and fixed in said upper station and constructed and arranged to receive and support a workpiece deposited thereon as said elevator is moved from said second position toward said first position.

4. The line of claim 1 wherein said drive for said elevator comprises a cycloidal mechanism operably connected to said elevator.

5. The line of claim 1 wherein said one workpiece support is associated with and fixed in said lower station adjacent one end of said transfer mechanism and constructed and arranged to receive and support a workpiece in said lower station, and which also comprises a second workpiece support associated with and fixed in said upper station and constructed and arranged to receive and support a workpiece, a third workpiece support adjacent the other end of said transfer mechanism, and said elevator is constructed and arranged such that when raised from said first to said second position with said transfer mechanism retracted any workpiece on said one support is picked up by said transfer mechanism and when lowered from said second to said first position with said transfer mechanism extended any workpiece at said other end of said transfer mechanism is deposited on said third workpiece support.

6. The line of claim 1 wherein said drive for said elevator comprises a Scott Russell linkage operably connected to said elevator.

7. The line of claim 1 wherein said drive for said elevator comprises a plurality of fluid actuated cylinders connected together in tandem and one of said cylinders is operably connected to said elevator.

8. The line of claim 1 wherein said drive for said elevator comprises a Geneva mechanism operably connected to said elevator.

9. The line of claim 5 wherein said drive for said elevator comprises a cycloidal mechanism operably connected to said elevator.

10. The line of claim 1 wherein said drive for said elevator comprises a Geneva mechanism having a Geneva wheel constructed and arranged to provide four substantially equal indexes for each revolution of said wheel, a crank pin carried by said wheel for movement therewith at an acute included angle of at least about 10° to a dwell of said wheel, and said crank pin being operably connected with said elevator.

11. The line of claim of 10 wherein said acute included angle of said crank pin lags a dwell of said wheel by at least 10°.

12. The line of claim 10 wherein said acute included angle of said crank pin leads a dwell of said wheel by at least 10°.

13. The line of claim 1 wherein said drive for said elevator comprises a base, a carrier arm jounalled for rotation on said base, a first timing member journalled for rotation on said carrier arm about its axis with such axis spaced from and parallel to the axis of rotation of said arm on said base, a second timing member fixed with respect to said base with its axis coincident with said axis of rotation of said arm, said first and second timing members having pitch diameters and teeth in a ratio of 1:4 and being operably connected such that each whole revolution of said first timing member rotates said arm a quarter of a revolution around said base, a crank pin mounted in fixed relation to said first timing member with its axis substantially parallel to and eccentrically offset from said axis of said first member, said crank pin being operably connected with said elevator, and means for rotating said first timing member through a complete revolution to move said crank pin along a generally square path, with dwells in the corners of the path and an decelerating motion between the corners of the path.

14. The line of claim 13 wherein the timing members are constructed, arranged and connected such that there is an acute included angle of at least 10° between a reference line intersecting the axis of rotation of said arm and the center line of said arm when the center of said crank pin is thereon.

15. The line of claim 14 wherein when said acute included angle is at least 10°, said crank pin is spaced clockwise of said reference line.

16. The line of claim 16 wherein when said acute included angle is at least 10°, said crank pin is spaced counterclockwise of said reference line.

* * * * *